United States Patent [19]

Graham, Jr.

[11] Patent Number: 5,050,793
[45] Date of Patent: Sep. 24, 1991

[54] SYSTEM FOR INTERCONNECTING PANELS

[76] Inventor: Andrew S. Graham, Jr., 2802 Jefferson Ct., Ambler, Pa. 19002

[21] Appl. No.: 506,664

[22] Filed: Apr. 9, 1990

Related U.S. Application Data

[63] Continuation-in-part of Ser. No. 293,828, Jan. 5, 1989, Pat. No. 4,914,874, which is a continuation-in-part of Ser. No. 117,215, Nov. 4, 1987, Pat. No. 4,796,392, which is a continuation-in-part of Ser. No. 841,477, Mar. 19, 1986, abandoned, which is a continuation-in-part of Ser. No. 710,492, Mar. 11, 1985, Pat. No. 4,584,806.

[51] Int. Cl.$^5$ ........................ B65D 19/16; B65D 9/12
[52] U.S. Cl. ............................... 229/125.23; 52/584; 229/198; 229/23 R
[58] Field of Search ........................ 220/4.28, 4.33, 693; 229/23 R, 125.21, 125.23, 198, 198.1; 217/65, 61, 69; 52/584

[56] References Cited

U.S. PATENT DOCUMENTS

| | | | |
|---|---|---|---|
| 428,726 | 5/1890 | Mergott | 229/125.23 |
| 2,083,621 | 6/1937 | Smith | 229/125.23 |
| 2,246,966 | 6/1941 | Zalkind | 229/198.1 |
| 2,918,319 | 12/1959 | Richardson | 229/125.23 |
| 2,919,826 | 1/1960 | Richter | 220/4.323 |
| 3,466,710 | 9/1969 | Kupersmit | 229/125.21 |
| 3,760,970 | 9/1973 | Lutz | 220/4.33 |
| 3,990,599 | 11/1976 | Rowley | 217/65 |
| 4,024,977 | 5/1977 | Rowley | 217/65 |
| 4,139,113 | 2/1979 | Graham, Jr. | 217/65 |
| 4,584,806 | 4/1986 | Graham, Jr. | 217/65 |
| 4,796,392 | 1/1989 | Graham, Jr. | 52/584 |
| 4,914,874 | 4/1990 | Graham, Jr. | 220/1.5 |

Primary Examiner—Gary E. Elkins
Attorney, Agent, or Firm—Charles H. Lindrooth

[57] ABSTRACT

A container fastener system which facilitates construction and use of containers formed of tri-wall or other multi-layer corrugated paper board is disclosed. Plate and clip fastening systems particularly adapted for interconnection of panels in overlapping relationship are disclosed. The arrangement facilitates adhesive attachment of the plate components to the panels and the attachment and interconnection of the plate components by clip members without penetration of the surfaces of the panels. One plate component of each pair is provided with a retainer flange which prevents lateral separation of one panel with respect to the other so as to maintain the integrity of the container when the panels are fastened together.

14 Claims, 3 Drawing Sheets

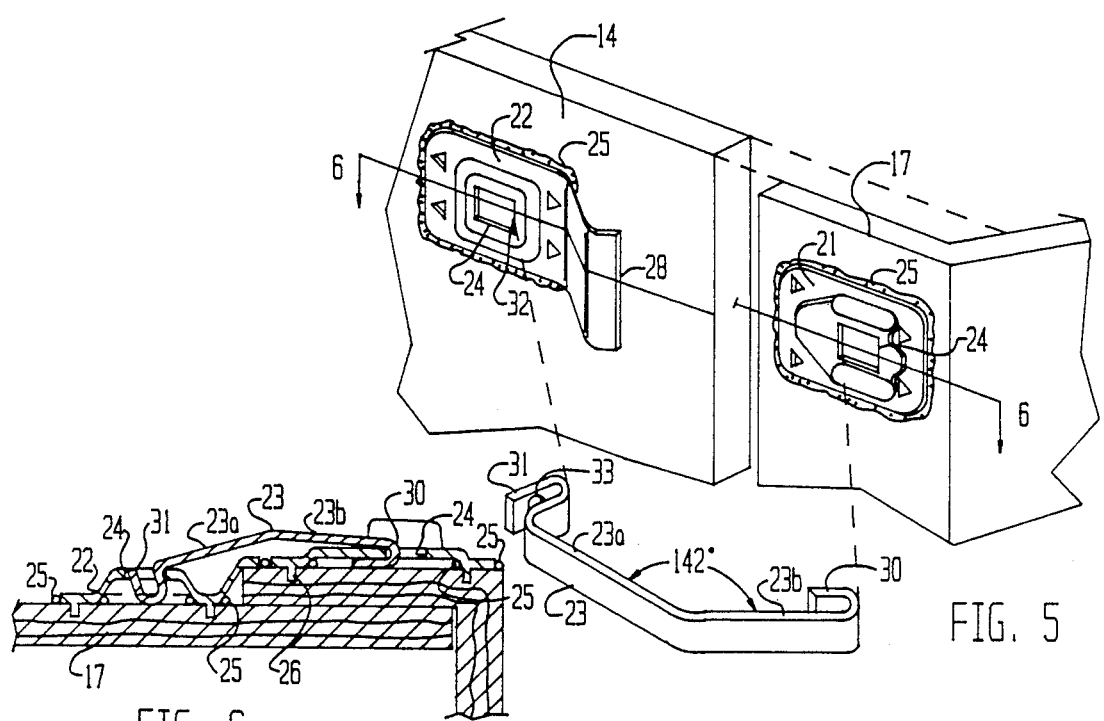
FIG. 5
FIG. 6
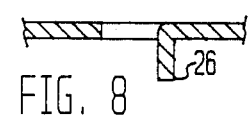
FIG. 8
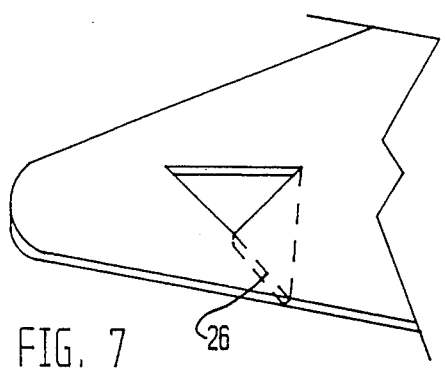
FIG. 7

SYSTEM FOR INTERCONNECTING PANELS

RELATED APPLICATIONS

The present application is a continuation-in-part of my application Ser. No. 07/293,828 now U.S. Pat. No. 4,914,874, filed on Jan. 5, 1989, which is a continuation-in-part of U.S. Ser. No. 07/117,215, filed on Nov. 4, 1987, now U.S. Pat. No. 4,796,392 which is a continuation-in-part of my prior application Ser. No. 841,477, filed on Mar. 19, 1986, now abandoned, which is a continuation-in-part of my prior application Ser. No. 710,492, filed Mar. 11, 1985, now U.S. Pat. No. 4,584,806.

FIELD OF THE INVENTION

This invention relates to fastening means comprised of spring clips and connector plates and to reusable containers comprised of panels and pieces interconnected with such fastening means. In particular, the invention relates to spring clip and connector plate fastening systems for interconnecting panels disposed in overlapping relationship.

BACKGROUND OF THE INVENTION

Although not limited thereto, the invention is particularly applicable to the formation of knockdown reusable containers and enclosures formed of panels and pieces of fibrous material such as a multi-ply corrugated board, commonly referred to in the trade as tri-wall.

Panel interconnecting systems are well known, especially for the interconnection of panels along end corners or edges of rectangular containers where the panels extend from each other, usually at angles of 90°, examples of which are shown in my prior U.S. Pat. No. 4,139,113, issued Feb. 13, 1979 and in the patents and application referred to above of which this application is a continuation-in-part. My prior U.S. Pat. No. 4,584,806 discloses a system for interconnecting panels wherein the panels are abutted to one another and the joint between the panels is at an angle of from 180° to 90° or even less. In my prior U.S. Pat. No. 4,796,392 and in my application Ser. No. 07/293,828, which will issue as U.S. Pat. No. 4,914,874 on Apr. 10, 1990, a system is disclosed in which a side of one panel overlaps the end edge of an abutting panel. The connection systems just described are best adapted for use in the manufacture of reusable knockdown containers where the panels are formed of wood or other relatively rigid and durable material.

One of the important objectives of the present invention is the formation of reusable knockdown containers incorporating a novel form of spring clip and connector plate fastening system for interconnecting panels and pieces, wherein the container is made up of panels and pieces of a less durable and less rigid construction.

A still further objective of the invention is a provision of a releasable and reusable panel fastening system for attachment to container panels not well adapted for fastening with conventional fasteners. More particular, it is an objective of the invention to avoid the need for nails, screws, rivets or the like for fastening the plate components to the panels and pieces.

A related objective of the invention is the use of panel fastening means comprised of plate-like components which are well adapted to be adhesively secured to the panels which are to be interconnected.

A still further objective of my invention is the provision of a novel container system which facilitates side loading of containers formed of multiple panels and joined together according to the invention.

The above and other objectives of my invention are achieved by a fastening system which comprises paired plate-like components having apertures, the components being mounted adjacent to the edges of panels or planar surface which are in overlapping relationship to one another. The fastening system further comprises resilient spring clips which include a pair of oppositely extending spring arms, one of which has an end hook portion adapted to fit over the side edge of the aperture in one plate-like component and the other having a detent end portion dimensioned to fit within the aperture of the other plate-like component. The first plate-like component formed according to the invention is provided with a raised retainer flange which is disposed to overlap the side edge of the other panel, thereby preventing lateral separation of the overlapping panel portions.

According to a further aspect of the invention, the plate-like components are constructed so as to provide clearance between the edge surfaces of the apertures and the panel surfaces for the end hook and detent portions of the spring arms so as to avoid scarring, gouging or penetration of the panel surface when the spring clips are in position.

According to still another aspect of the invention, the plate-like components are formed with downwardly directed pointed darts or lances which provide limited penetration of the surface of the panel to which they are joined. When the plate-like components are intended to be adhesively secured to the panels, the darts position the plate-like components during the set-up of the adhesive. Still further, although the adhesives have excellent tensile properties, they may be weak in shear strength and the darts serve to resist any forces which may act to shear a plate from the surface to which it is secured.

The fastening systems of the present invention may be used in combination with the fastening systems disclosed and claimed in the cases above identified, as for example where a container formed partially of wooden panels and partially of corrugated panels may be desirable. It is also to be understood that the fastening systems of the present invention are applicable to a wide variety of structures incorporating interconnected panels and the term container herein is not to be used in a limiting sense.

BRIEF DESCRIPTION OF THE DRAWINGS

In the accompanying drawings:

FIG. 5 is a fragmentary exploded view of a container corner construction illustrating the fastening mean of the present invention;

FIG. 6 is a cross-section through a container corner illustrating the fastening means at a joint in assembled form;

FIG. 7 is a fragmentary view of a portion of one form of plate component incorporating principles of the invention; and FIG. 8 is a cross-sectional view of the fragment shown in FIG. 7.

DETAILED DESCRIPTION

Figure 1:
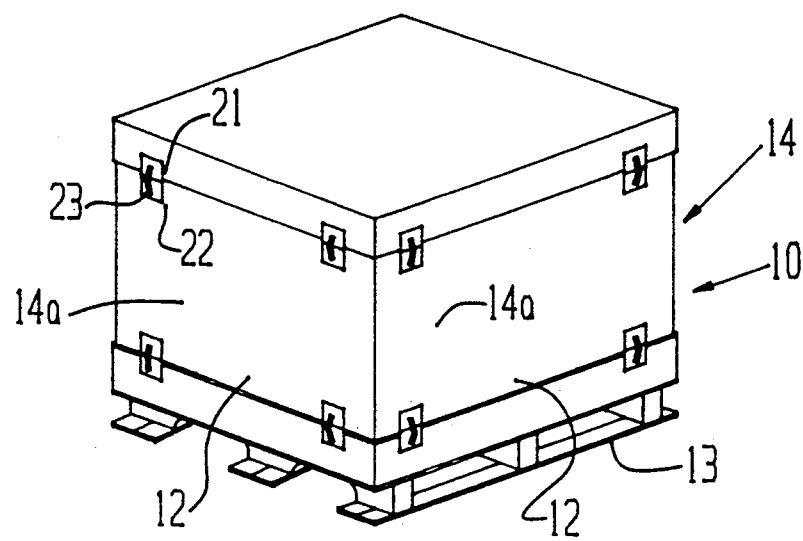
FIG. 1 shows an assembled palletized container with fastening means, all formed according to the teachings of the present invention.
Figure 2:
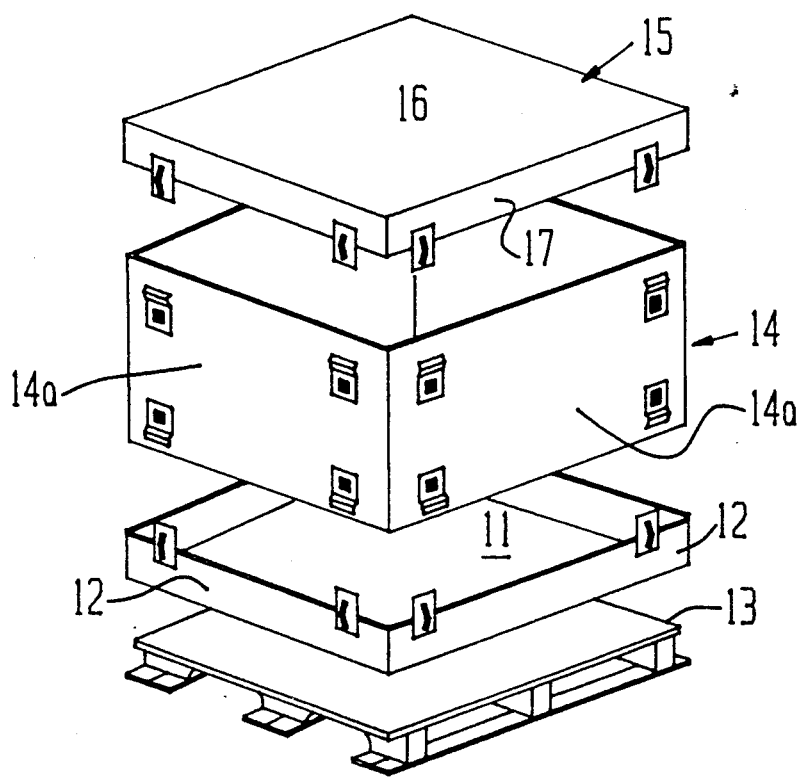
FIG. 2 is a exploded view of the container shown in FIG. 1.

Reference is first made to FIGS. 1 and 2 showing a container typically formed of multi-ply corrugated board of the type known in the trade as tri-wall. The container typically is comprised of a rectangular base portion 10, sometimes called a bottom cap, which is comprised of a base panel 11 and upturned boundary flanges 12 which extend upwardly from the perimeter of the base. Typically, the base cap is stapled or otherwise fastened to a pallet 13. In accordance with standard techniques, the flanges 12 are formed by folding the perimeter of the base panel 11 upwardly along score or fold lines and then taping or otherwise interconnecting the corners where the flanges join one another.

The container further comprises a tri-wall sleeve portion 14 which is bent along fold or score lines to form four rectangularly disposed and interconnected panels 14a, dimensioned to fit within the boundaries of the bottom cap with the four panels comprising the sleeve in face-to-face contact with the inside surfaces of flanges 12.

The container further comprises a top cap 15 typically constructed identically to the bottom cap 10 and comprised of a cover or top panel 16 and downturned interconnected side flanges 17. In assembled form, the top cap fits over the sleeve with the inner surfaces of side flanges 17 overlapping and in contact with the upper outside surfaces of the panels 14a.

As shown in FIGS. 1, 2 and more particularly in FIGS. 5 and 6, the fastener systems incorporating the principles of the present invention comprise apertured plate components 21 and 22 and resilient spring clip component 23. The plate components are disposed in paired spaced relationship as will be described at suitable locations on the top and bottom cap and on the sleeve and are interconnected by the clip components so as to secure the bottom cap or base to the sleeve and the sleeve to the top cap or cover. Preferably, on a standard 4'×4'×40" palletized container, fastening systems will be disposed to interconnect the sleeve to the top and bottom cap at positions displaced adjacent to each corner of the container, it being understood that additional fastening systems may be disposed at intermediate positions between the corners particularly in longer, non-standard containers.

Attention is now called to FIGS. 5 and 6 for a detailed description of a fastening system incorporating the principles of the invention. As indicated above, the fastening system comprises a pair of apertured plate components 21 and 22 and an interconnecting spring clip component 23.

Each plate component is provided with a central aperture 24 of substantially rectangular shape which can be larger or smaller depending upon clip design and whether or not it is intended that the hook end of the clip be permanently retained within its aperture. Preferably, the apertures are raised with respect to the base surfaces of the plate components for reasons which will appear hereinafter. Typically, the plate components 21 and 22 are formed from sheet steel with the raised sections being formed in a stamping die in a manner known in the art. In the case of containers formed of paper board material such as tri-wall, it is preferred that the plate components be formed with downwardly extending pointed darts or lances 26 (FIGS. 7 and 8) which are formed during the stamping process and penetrate the fibrous material when the plates are mounted on the panels.

In application to the container panels, the plate components 21 and 22 are preferably adhesively secured in place as shown at 25, particularly where materials such as tri-wall are utilized for the container. Typically, epoxy or other polymeric adhesive materials are found to have the requisite adhesive properties for securing the plate components to the panels. Although other adhesives may be employed, a two-part polymer adhesive marketed by the Lord Company of Erie, Pennsylvania as Fusor, product number 320/322 has been found to produce excellent results. In the application of the plate components to the panels, the adhesive is applied and the plate components pressed against the panels with sufficient force so that the darts 26 penetrate the panel surfaces. The darts hold the plate components in place as the adhesive sets up and thus serve as temporary positioning means. The darts further resist shear forces to which the plates may be exposed once the adhesive has properly cured.

As shown in FIG. 5, plate component 21 is disposed on flange 17 adjacent one edge thereof. Plate component 22 is disposed on a typical panel 14 and is offset from the side edge of that panel by an amount equal to the depth of the flange 17.

An important feature of plate component 22 is the provision of a raised retainer flange 28 which is disposed on the plate component along the side facing the flange 17. In accordance with the invention, retainer flange 28 is raised relative to its base by an amount equal to the depth of flange 17 so that it snugly fits over the flange 17 as can be seen in FIG. 6.

As shown in FIGS. 5 and 6, a resilient spring steel clip component 23 formed similarly to the clips shown in FIG. 9 of my U.S. Pat. No. 4,584,806 is employed. The clip component 23 is provided with angularly disposed arms 23a and 23b having end fastening elements which interengage with apertures 24 in the plate components. As shown in FIG. 5 and in common with my prior cases, one arm 23b is provided with a hook shaped end 30 which is preferably formed by bending the end of arm 23b approximately 180°. The end 23a is formed as a resilient detent 31 as described in my prior patents and applications. In use, where overlapping panels of tri-wall are joined where the thickness of a tri-wall panel is a standard ⅜", I have found that the spring arms are preferably angled at about 142° as indicated in FIG. 5. This angle will vary somewhat depending upon the application, particularly when overlapping panels of different thicknesses are employed, it being understood that the thickness of flange 17 will have an influence of the desired angularity of the spring arm.

As noted above, the apertures formed in the plate components are preferably raised with respect to the surfaces to which the plate components are affixed. FIG. 6 illustrates an assembled joint with the hook end 30 on spring arm 23b fitted underneath the raised surface of the plate component surrounding the aperture 24. The detent end of the spring clip similarly is fitted within the aperture 24 on plate component 22, it being understood that the portion of plate component 22 surrounding the aperture 24 is raised sufficiently to allow for clearance of the lower section of the detent end and the surface of the panel 17. In use, the hook end is first fitted into the aperture in plate 21 and the detent end pressed firmly so that the spring arms flex and the detent end 23 snaps over edge 32 of the aperture in plate 22.

If desired, the aperture intended to receive the hook end 30 may be made shorter than the length of the hook to permanently retain the hook end within the aperture. If so formed, the detent end of the spring clip is threaded through the aperture from the bottom of the plate 21 before it is secured to the container. Once the plate 21 is secured in place, the clip cannot be removed, thereby preventing accidental loss of clips during us of the system.

The detent end 31 may be provided with a slot 32 which is intended to receive the blade of a screwdriver for ease of removal of the clip when opening and disassembling the container.

The arrangement just described is of particular advantage in the use of the fastening system in containers formed of paper board and in particular corrugated board since it is highly desirable that the surfaces of such board not be broken by openings which would allow moisture to readily penetrate the corrugations forming the plies of materials. Thus, the need for forming clearance holes for the detent ends as provided for in my U.S. Pat. No. 4,139,113 is avoided.

Figure 3:
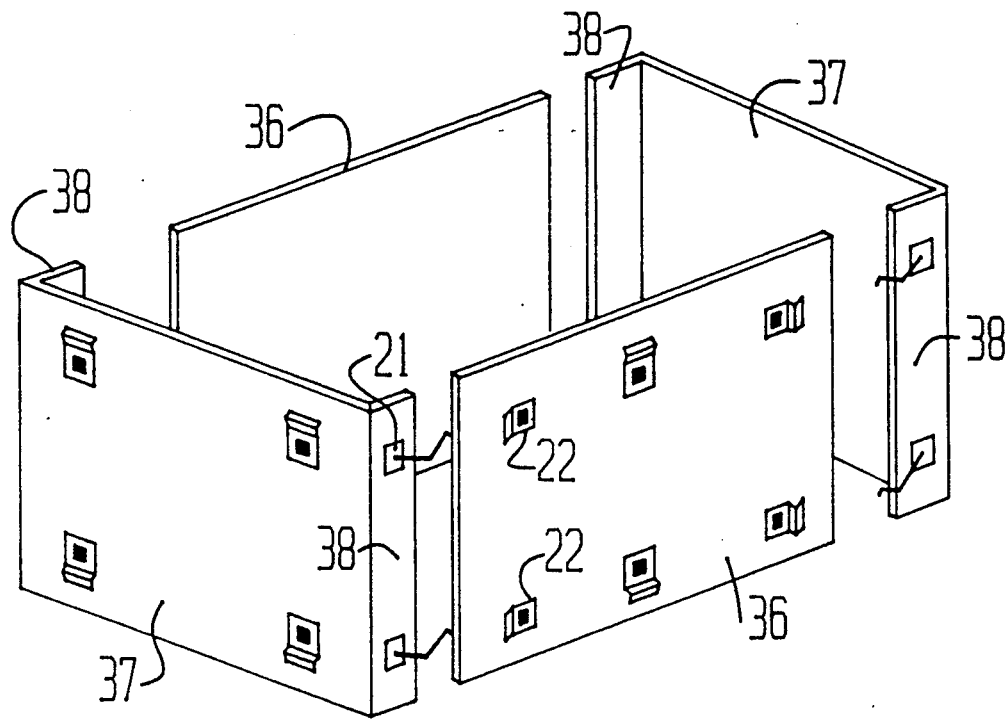
FIG. 3 is an exploded view of portions of a modified form of container incorporating the novel fastening means herein described.
Figure 4:
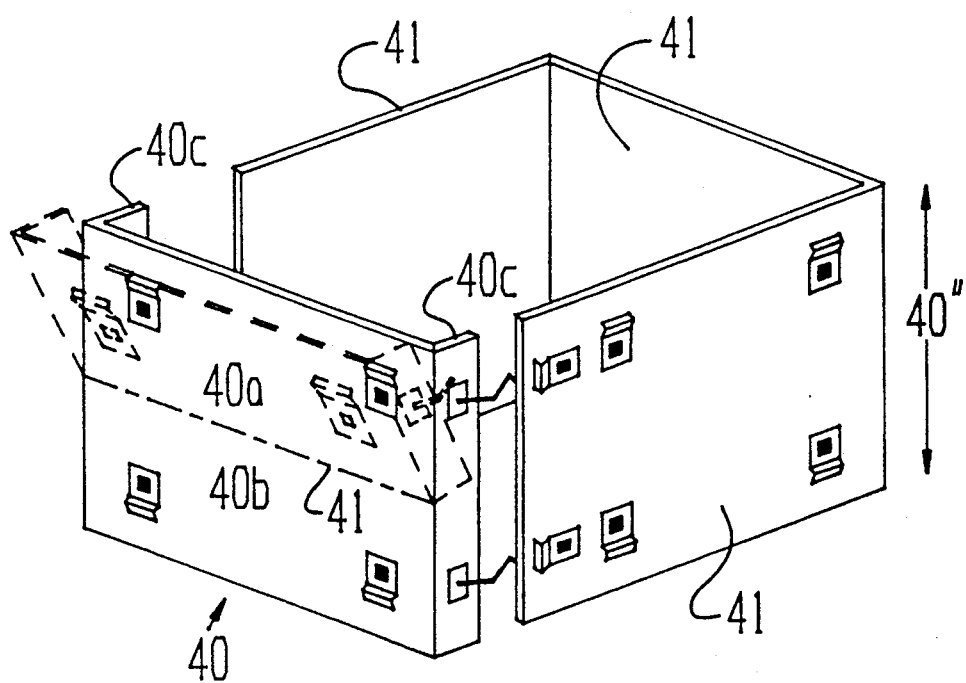
FIG. 4 is a modified form of one portion of a container of FIGS. 1 through 3.

Modified forms of containers incorporating the principles of my invention are disclosed in FIGS. 3 and 4.

FIG. 3 illustrates a four piece sleeve which is of advantage for shipment and storage of the components forming a container in knockdown form. In FIG. 3, the sleeve is comprised of side panels 26 and end panels 37 which are formed with side flanges 38. The clip system fastening elements are disposed on the side panels 36 and on the flanges 38 of the end panels 37 in the manner described above with plate components 22 being disposed on the side panels and plate components 21 disposed on the flanges 38. A particular advantage of the arrangement shown in FIG. 3 is that the side and end panels may be stacked and stowed in a much more compact bundle than is the case where the sleeve is made of a single piece formed of four permanently interconnected panels.

Still further, in the modification of FIG. 4, one end panel shown at 40 in FIG. 4 is comprised of two interconnected pieces 40a and 40b which are joined along a hinge line 41 which is conveniently formed by scoring the panel 41 and cutting through the flanges 40c so that the upper panel portion 40b folds outwardly and downwardly when desired. An advantage of the utilization of a panel 40 in conjunction with panels 36 and 37 or with three interconnected panels 41 as illustrated in FIG. 4, is that the panel portion 40b may be hinged down so that side loading and unloading of the container may be accomplished. This is of particular convenience where it may be desired to stack one loaded container on top of another and yet allow for ready access to the contents of both containers.

Although the systems above described are particularly adapted for use with paper board and in particular corrugated multiple-ply paper board containers, containers formed of metal or other materials may also be joined together using clip and plate systems of the present invention. Screws, bolts or conventional welding techniques may be used to fasten the plate components to the panel surfaces and thereby accomplish certain important aspects of the invention. The invention is of particular advantage, however, in the field of corrugated tri-wall panel construction and in particular is of advantage where it is desirable to provide interconnected panels for containers where it is undesirable or impractical to penetrate the container with conventional fastening means.

I claim:
1. A fastening system for joining panels of a container in overlapping relationship comprising:
   first plate means having a raised portion with an aperture, said first plate means being mounted on a first of said panels in a position on the panel offset from a side edge thereof;
   a second plate means having a raised central portion having an aperture, said second plate means being mounted on a second panel adjacent a side edge thereof, the side edge of the second panel being disposed adjacent to the first plate means with the portion of the second panel adjacent to the side edge being in face-to-face contact with the region of the first panel between the first plate means and the side edge thereof;
   a resilient spring clip having a pair of oppositely extending spring arms, one of said arms having an end hook portion adapted to fit over the side edge of the aperture in one of said plates, the other spring arm having a detent end portion, said detent end portion being dimensioned to fit within the aperture in the other of said plate means, the detent end portion and the raised portion being relatively dimensioned and proportioned to provide clearance for the detent portion with respect to the panel;
   said first plate means having a raised retainer flange disposed in overlapping relationship with the side edge of the second panel.
2. A fastening system according to claim 1 wherein the clip arms are angled at about 140° with respect to one another when the clip is unstressed.
3. A fastening system according to claim 1 wherein said plate means are adhesively secured to the surfaces of said panels.
4. A fastening system according to claim 3 further including piercing projections extending downwardly from the plate means, said piercing projections being adapted to penetrate said sheet-like pieces to prevent shear slipping of the plates relative to the panels.
5. A knockdown container formed of corrugated board or the like comprising:
   a base portion comprising a planar base having upturned boundary flange extending around the planar base;
   a continuous sleeve portion having upright walls dimensioned to fit on said base portion within the boundaries of said flanges with the base flanges overlapping the bottom edges of the walls of the sleeve portion;
   a lid portion comprising a planar top and a downturned boundary flange extending around the planar top, said lid portion being dimensioned to fit on said sleeve portion with the boundary flanges overlapping the top edges of the walls of the sleeve portion and in contact therewith, and fastening means for joining the base to the sleeve and the sleeve to the top, said fastening means comprising paired connector plates adhesively secured to said boundary flange portions, each of said plates having apertures and a flexible spring clip extending from one aperture to the other and having end retainer portions adapted to fit within said apertures when the clip is flexed.

6. A container according to claim 5 wherein each connector plate on the sleeve portion has a raised retainer flange disposed in overlapping relationship with the adjacent boundary flange portion.

7. A container according to claim 6 further including downwardly projecting piercing projections on said plate means, said piercing projections being adapted to penetrate said sheet-like pieces to prevent shear slipping of the plates relative to the panels.

8. A container according to claim 7 wherein one of said end retainer portions comprise a hook adapted to fit within one of said apertures and the other end retainer portion comprises a detent adapted to interfit with the other of said apertures.

9. A container according to claim 8 wherein the apertures of said plates are raised to allow clearance for the end retainer portions relative to the surfaces of the respective sleeve and boundary flange portions.

10. A knockdown container according to claim 6 wherein said sleeve portion comprises side wall portions and at least one separate end wall portion, said separate end wall portion having side flanges for overlapping the end edges of said side wall portions and paired aperture connector plates adhesively secured to said side flanges and to said side wall portions adjacent to the edges of said side flanges, and a flexible spring clip extending between said paired plates and having end retainer portions fitting within said apertures to interconnect the plates when the clip is flexed.

11. A knockdown container according to claim 10 wherein said end wall portion has a hinged, fold down upper portion adopted to be folded down when said lid portion is removed.

12. A fastening system for joining panels of a container in overlapping relationship comprising:
first plate means having a raised portion with an aperture, said first plate means being mounted on a first of said panels in a position on the panel offset from a side edge thereof;
a second plate means having a raised central portion having an aperture, said second plate means being mounted on a second panel adjacent a side edge thereof, the side edge of the second panel being disposed adjacent to the first plate means with the portion of the second panel adjacent to the side edge being in face-to-face contact with the region of the first panel between the first plate means and the side edge thereof;
a resilient spring clip having a pair of oppositely extending spring arms, each of said arms having an end retainer portion adapted to fit over the side edge of the aperture in one of said plates;
said first plate means having a raised retainer flange disposed in overlapping relationship with the side edge of the second panel.

13. A fastening system according to claim 12 wherein one of said spring arm retainer portions comprises a hook and the other spring arm retainer portion comprises a detent, the detent end portion and the raised portion receiving said detent end portion being relatively dimensioned and proportioned to provide clearance for the detent end portion with respect to the subadjacent panel.

14. A fastening system according to claim 12 wherein the hook end portion and the raised portion receiving said hook end portion are relatively dimensioned and proportioned to provide clearance for the hook end portion with respect to the subadjacent panel.

* * * * *